Figure 1:
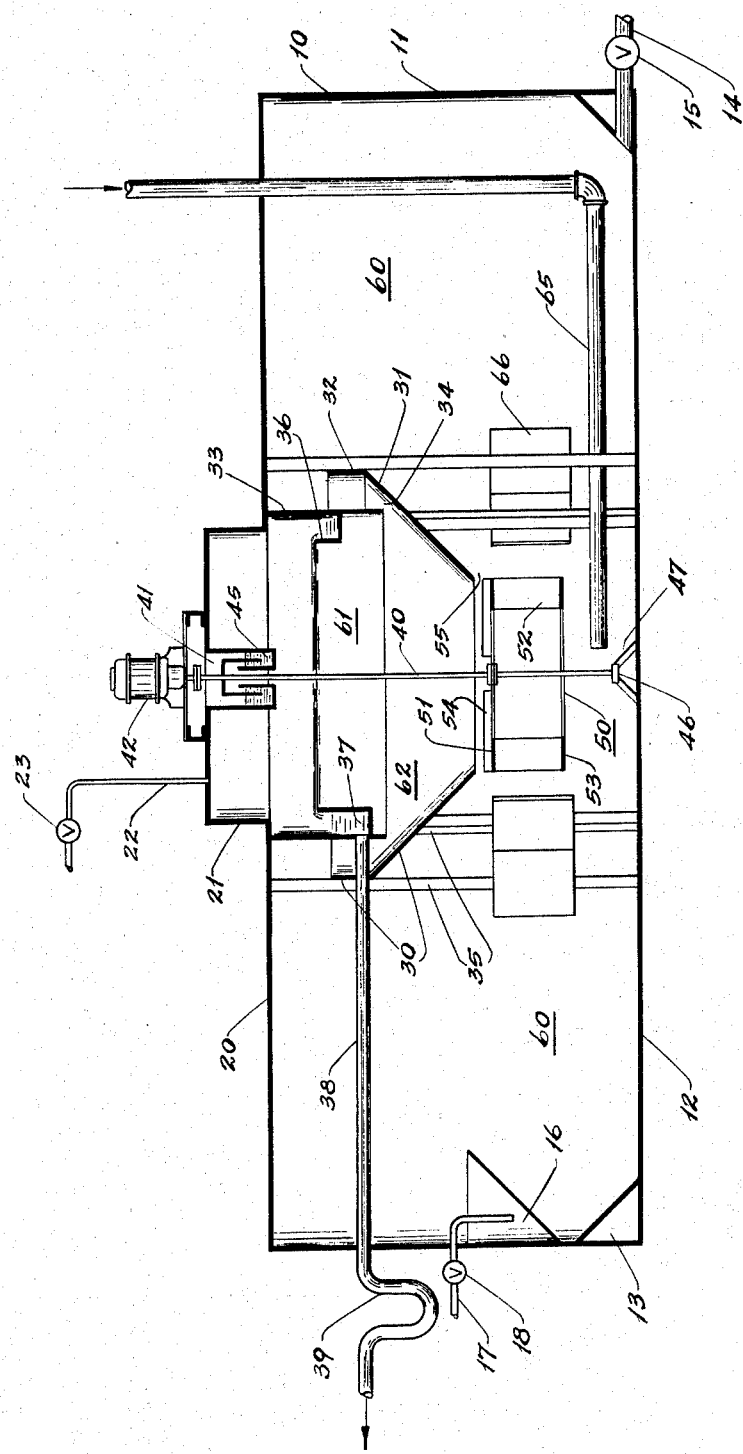

United States Patent Office 2,907,712
Patented Oct. 6, 1959

2,907,712

APPARATUS FOR ANAEROBIC DIGESTION

Fred A. Eidsness, Gainesville, Fla., and Anton A. Kalinske, Tucson, Ariz., assignors to Infilco Incorporated, Tucson, Ariz., a corporation of Delaware Application July 23, 1956, Serial No. 599,434

3 Claims. (Cl. 210—208)

This invention relates to the anaerobic digestion and clarification of liquid wastes.

The term "liquid wastes" is used herein to denote primarily industrial wastes, and particularly high strength industrial wastes, such as packing house or dairy wastes, but the invention is applicable also to sludge from domestic sewage and the like.

It is an object of the invention to provide an improved apparatus for anaerobic digestion.

Another object of the invention is to provide an apparatus for accelerating the anaerobic digestion of liquid wastes.

It is a particular object of this invention to provide in a digester improved agitation and circulation and improved liquid-solids separation.

A further object of this invention is to provide an apparatus for dynamically separating supernatant liquid from digesting solids.

Another object is to provide an anaerobic digester wherein the formation of scum layers is minimized.

Another object is to provide, in an anaerobic digester, a dispersing and circulating member setting up a circulation in vertical planes and a circulation in horizontal planes at a velocity preventing sedimentation.

Other objects will become apparent upon consideration of the detailed description and of the claims, which follow.

It has long been recognized that anaerobic digestion of liquid wastes is improved by a certain amount of agitation and mixing of the different layers of digesting sludge. The agitation and mixing due to the rising bubbles of digester gas has been supplemented in many cases by various kinds of agitators. Common to all of these is that they effect local mixing rather than setting up a pattern of circulation which includes the entire mass of digesting wastes and dispersing the newly entering wastes through the circulating mass. This is mainly due to the fact that the rotors used in digester agitation are of the axial flow type and are, therefore, not capable of setting up a circulation in horizontal planes. Contributing to the unsatisfactory agitation heretofore provided was the common belief that liquid-solids separation in a digester must be effected under quiescent conditions. Therefore, even where the circulation zone was allowed to reach down to the tank bottom, it was confined to a relatively narrow sphere surrounded by zones of relative quiescence to permit gravity separation of supernatant from the solids and thickening of the settled sludge.

The present invention does away with this concept. It provides a circulation of the entire digester contents in horizontal and vertical planes over the width and height of the digester and at a velocity greater than the settling velocity of the solids in the wastes under digestion, and replaces the usual quiescent liquid-solids separation by a dynamic separation of supernatant from a downwardly flowing stream of wastes, with highly beneficial results both with respect to accelerating the digestion rate and suppressing scum layer formation.

The invention will be more readily understood by reference to the drawings which form a part hereof and wherein like reference characters designate similar elements.

Figure 2:
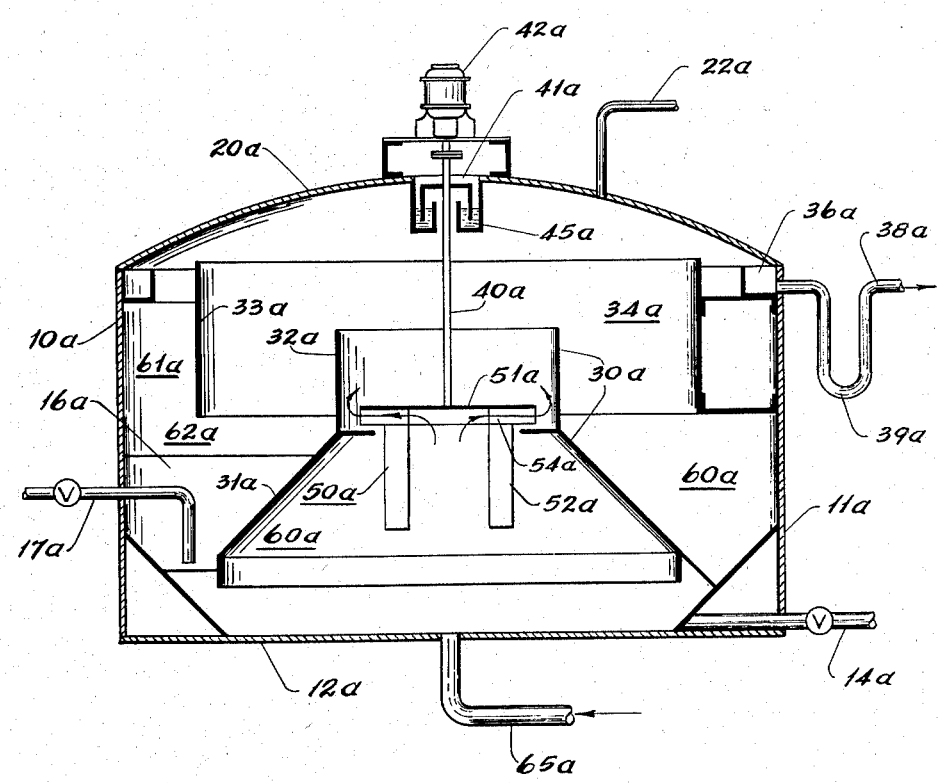

Figure 1 is a vertical cross-sectional view of one embodiment of an apparatus according to the invention; and Figure 2 is a vertical cross-sectional view of another embodiment of an apparatus according to the invention.

The digester of Figure 1 comprises a tank 10, which may be of any suitable shape, but is shown for purposes of illustration as round, and has a side wall 11 and a substantially flat bottom 12. A fill 13 may be provided to facilitate flow to the center of the tank 10 and avoid deposits on the bottom along the wall 11. To permit complete draining of the digester, a drain pipe 14 leads from the lower portion of the tank 10 and is provided with a valve 15. A solids concentrator 16 is provided and may be attached to the wall 11, as shown. While only one concentrator is shown, any suitable number may be provided. A solids withdrawal conduit 17 provided with a valve 18 leads from the concentrator 16.

The tank is covered by a gas tight roof 20 which may be integral with the side wall or affixed thereto by any suitable means, not shown, affording a gas tight seal. The roof 20 is shaped to provide a gas collection space, which may be in the form of a gas dome 21, as shown in Figure 1, or the entire roof may be curved upwardly as shown in Figure 2. A gas outlet pipe 22 leads from the gas dome 21 to a point of use and is provided with a valve 23.

Axially aligned within the upper central portion of the tank 10 is a vertically extending partition 30 which is shown for purposes of illustration as an inverted frusto-conical member 31 merging into a tube 32 which terminates below the normal liquid level in the tank. The partition 30 is open at its bottom to the lower portion of the tank 10. Within the space enclosed by the partition 30, a cylindrical wall 33 extends from an elevation above the normal liquid level in the tank 10 downwardly to an elevation adjacent that of the lower end of the tube 32 and forms with the tube 32 a passageway 34. Any suitable means can be used to support the partition 30 in spaced relationship to the bottom of the tank 10. Preferably columns 35 extend upwardly from the bottom 12 and are symmetrically arranged about, and affixed to, the outside of the partition 30. The columns 35 also give support to the center portion of the roof 20. The cylindrical wall 33 may derive support from the tube 32, as shown. A launder 36 is attached to the wall 33 around its inner periphery and communicates through a collection box 37 with a supernatant withdrawal conduit 38, provided with a suitable liquid seal 39.

Axially aligned in the tank 10 is a shaft 40. The upper end of the shaft 40 passes through an opening 41 in the gas dome 21 and is connected to the output shaft of a motor-reducer 42 which may be supported on the roof 20. A suitable liquid seal 45 prevents air from entering the digester or gas from escaping therefrom through the opening 41. The lower end of shaft 40 is journaled in a bearing 46 affixed by a spider 47 to the bottom 12.

Rigidly affixed to the shaft 40 is a rotor 50 of the radial flow type. The rotor 50 includes a horizontal plate 51, a number of vertical blades 52 attached to the underside of the plate 51 and extending radially inwardly from spaced points along the periphery of plate 51 partway to the shaft 40, and a lower annular plate 53 of the same width as the blades 52. While for clarity's sake only two blades 52 are shown in the drawing, it will be understood that a suitable number of blades, usually at least eight, but with large rotors a much greater number, is used. Radial vanes 54 may be attached to the top of plate 51. As shown, the rotor has substantially the same diameter as the lower end of the partition 30, and is mounted closely subjacent thereto so as to form a restricted passageway 55 therewith.

The structure described above defines in the digester a mixing-circulation chamber 60 extending from the bottom of the tank to the liquid surface over the major portion of the cross-sectional area of the tank, and providing a large free rising space for digester gas, which collects under the roof 20 and in the gas dome 21; a relatively small, centrally located clarification compartment 61; and a liquid-solids separation space 62 underlying the compartment 61 and in open hydraulic communication therewith. The chamber 60 and space 62 are in hydraulic communication with one another at an upper elevation over the upper edge of the tube 32 and through the passageway 34, and at a lower elevation through the restricted passageway 55.

The rotor, upon its rotation, sets up within the lower portion of the digester chamber a three dimensional circulation outwardly to the tank wall, downwardly along the wall, inwardly along the tank bottom and back to the rotor.

Newly entering wastes are introduced through an inlet conduit 65 which discharges into the suction flow of the rotor, so that the newly entering waste is immediately dispersed through and incorporated in this circulation. To prevent undue rotation of liquid in the outer portion of the circulation chamber 60 about the vertical axis of the tank 10, radial baffles 66 may be attached to the columns 35, as shown.

The rotor plate 51 also provides a positive pumping force which is largely increased by the vanes 54. This establishes a secondary circulation in predominantly vertical planes from the lower part of the tank to the liquid surface outside the partition 30, over the upper edge of the tube 32, through the passageway 34, the liquid-solids separation space 62, and restricted passageway 55 back to the rotor. The digester gas rising upwardly in the circulation chamber 60, aids the rotor in lifting the liquid to the overflow edge of the tube 32.

In operation the wastes to be digested enter through conduit 65 continuously or intermittently, depending on the nature of the wastes, and are dispersed by the rotor 50 through the circulating digesting mass in the lower portion of the circulation chamber 60. The pumping force of the rotor 50 causes a continuous circulation of a portion of the digesting mass from the lower part of chamber 60 upwardly to the elevation of the upper end of the tube 32, and downwardly through passageway 34, the liquid-solids separation space 62 and passageway 55 back to the lower portion of chamber 60. In the space 62 an output portion of at least partially clarified supernatant separates from the downward flow and is displaced by newly entering wastes upwardly into compartment 61 and to the launder 36, from which it is withdrawn through supernatant conduit 38.

A portion of the digesting solids enters the concentrator 16, which provides a quiescent thickening zone, from which thickened digested sludge is withdrawn at suitable intervals. Instead of locating the thickening zone inside the digester, a separate sludge thickener can be used. In such case sludge may be withdrawn from any portion of the circulation chamber, but preferably is taken from the liquid-solids separation space 62, where the concentration is highest.

The continuous circulation of digesting wastes in vertical planes keeps the entire liquid surface in the circulation chamber in motion and prevents formation of a scum layer. Any scum forming is immediately removed from the surface by the circulating wastes and mixed therewith. The gas bubbling up through the liquid surface further insures against formation of a scum layer.

The clarification compartment 61 can be quite small as compared with the circulation chamber 60 wherein the digestion takes place, since the hydraulic loading in treating high strength wastes is small relative to the organic loading. In the treatment of sewage sludge, on the other hand, it is not necessary to completely clarify the supernatant, which, customarily, is returned to the treatment plant. Due to the large space provided for digestion in the circulation zone 60, the excellent mixing of newly entering wastes with wastes in the process of digestion effected by the rotor, and the dynamic separation of supernatant from the solids instead of the usual quiescent settling, the digestion rate is considerably accelerated and a smaller digester can be used.

The embodiment of Figure 2 offers the same advantages in a somewhat different apparatus.

In this embodiment the roof 20a of the tank 10a is shown for purposes of illustration curved upwardly, and a gas pipe 22a leads from it to some point of use. It will be obvious that the roof and gas dome of Figure 1 could be used instead.

The relatively small clarification compartment 61a is in the upper outer portion of the tank 10a while the major portion of the tank 10a is occupied by the circulation chamber 60a. A cylindrical wall 33a separates the compartment 61a from the chamber 60a. Supernatant is withdrawn from the clarification compartment 61a through a launder 36a affixed to the wall 11a, and a conduit 38a leading from the launder 36a and provided with a suitable liquid seal 39a. A valved drain 14a leads from the bottom portion of the tank 10a. A valved drain 14a leads from the bottom portion of the tank 10a. A concentrator 16a is provided in the lower portion of the circulation chamber 60a and thickened sludge is withdrawn therefrom through a valved sludge pipe 17a.

A partition 30a is axially aligned in the tank 10a in spaced relationship to the bottom 12a. The partition comprises a lower hood member 31a and an upper tubular member 32a.

As in Figure 1, a rotor shaft 40a, axially aligned in the tank 10a, extends through an opening 41a in the roof 20a and a suitable liquid seal 45a to outside the digester, and is connected with its upper end to the output shaft of a motor-reducer 42a which is supported by the roof. A rotor 50a is affixed to the shaft 40a and has a plate 51a and pumping vanes 54a at the elevation of the lower end of the tubular member 32a, and blades 52a extending into the space under the hood member 31a.

Upon its rotation the rotor 50a sets up a circulation of the contents of the hood 31a in predominantly horizontal planes, and also pumps a portion of the digesting wastes from the space under the hood 31a upwardly to the upper edge of the tubular member 32a. After overflowing the edge of tube 32a the wastes flow downwardly in the passageway 34a between tube 32a and wall 33a to and through a liquid-solids separation space 62a, spreading laterally across it, and return to the lower portion of the tank and the space under the hood 31a. Wastes entering through conduit 65a are discharged just below the hood and thus are quickly incorporated in the pattern of circulation maintained within the confines of the hood. Supernatant separates from the downwardly flowing wastes and is displaced by the incoming wastes upwardly through the clarification compartment 61a to the launder 36a from where it is withdrawn through conduit 38a. A portion of the sludge settles in the concentrator 16a, where it is allowed to thicken before it is discharged through conduit 17a.

The embodiment of Figure 2 also provides a large free-rising space for the digester gas which separates from the digesting wastes over the entire surface of the circulation chamber. Formation of a scum layer is prevented by the continuous circulatory movement at the liquid surface.

Many modifications will suggest themselves to those skilled in the art. Accordingly, it will be understood that the invention is not limited to the exact details of the embodiment shown and described for purposes of illustration and exemplification.

We claim:

1. In an apparatus for anaerobic digestion of liquid wastes comprising a tank, outlet means for removing solids from said tank, a gas-tight cover for said tank, means for removing gas from said tank, a clarification compartment having a wall in said tank, said compartment occupying only a minor portion of the upper part of said tank, and outlet means, including an overflow, for removing clarified liquid from said clarification compartment, said wall extending downwardly from an elevation above said overflow, partition means forming a passageway with the wall of said clarification compartment and establishing in said tank a mixing-circulation chamber and a liquid-solids separation space, said clarification compartment being superimposed on, and in unrestricted hydraulic communication with, said liquid-solids separation space, a rotor of the radial flow type in said mixing-circulation chamber, said rotor having pumping vanes adapted, upon rotation of said rotor, to establish a circulation of wastes in predominantly vertical planes from said mixing-circulation chamber through said passageway to said liquid-solids separation space, said rotor having blades adapted, upon rotation of said rotor, to establish a circulation of wastes in predominantly horizontal planes in the lower portion of said mixing-circulation chamber, means for rotating said rotor, and inlet means for introducing wastes to be digested to said mixing-circulation chamber.

2. An anaerobic digester for liquid wastes comprising a tank having a bottom and at least one upstanding wall, a gas-tight cover affixed to said wall and shaped to provide a gas collection space, means for withdrawing gas from said gas collection space, a vertical partition coaxially mounted in said tank and separating therein a supernatant clarification compartment from a circulation chamber, means including an overflow in said compartment for withdrawing supernatant from said tank, said partition extending downwardly from an elevation above said overflow, said compartment occupying a minor portion only of the upper part of said tank and being in unrestricted hydraulic communication across its lower end with said chamber, wall means coaxially arranged in said tank and laterally spaced from said partition and having an upper edge at an elevation subjacent said overflow, a rotor of the radial flow type in the lower portion of said chamber, said rotor including a plurality of radial blades and a plurality of radial pumping vanes, means for rotating said rotor, said blades, upon rotation of said rotor, setting up a horizontal circulation in the lower portion of said chamber, and said vanes, upon rotation of said rotor, setting up a vertical circulation in a flow path leading from said lower portion upwardly to the elevation of the upper edge of said wall means on the side of said wall means facing away from said partition, over said edge and downwardly back to the lower portion of said chamber on the side of said wall means facing said partition, a portion of the downward flow path underlying and being in open communication with said compartment across the lower end of said compartment, means for introducing wastes to be treated into the suction flow of said rotor, and means for withdrawing excess solids from said tank.

3. In an anaerobic digester for liquid wastes comprising a tank having a bottom and an upstanding wall, a gas-tight cover affixed to said wall and shaped to provide a gas collection space, a gas outlet conduit for withdrawing gas from said gas collection space, an inlet conduit for introducing wastes to be treated to the lower portion of said tank, means for withdrawing solids from said tank, and a tube forming a clarification compartment in said tank, said clarification compartment occupying only a minor portion of the upper part of said tank, a partition in said tank including a lower inverted frusto-conical member and an upper cylindrical wall coaxial with said tube, said cylindrical wall forming a passageway with said tube, said partition being supported in spaced relationship to said bottom, a launder affixed to said tube in said clarification compartment, a supernatant conduit leading from said launder, a rotor subjacent, and having a plate of substantially equal diameter as the lower end of, said partition, a plurality of radial pumping vanes extending upwardly from said plate, a plurality of radial blades extending downwardly from said plate, and means for rotating said rotor.

References Cited in the file of this patent

UNITED STATES PATENTS

| | | |
|---|---|---|
| 1,722,945 | Pruss | July 30, 1929 |
| 1,989,589 | Fischer et al. | Jan. 29, 1935 |
| 2,188,847 | Streander | Jan. 30, 1940 |
| 2,263,451 | Bach | Nov. 18, 1941 |
| 2,391,738 | Prager | Dec. 25, 1945 |
| 2,428,418 | Goetz et al. | Oct. 7, 1947 |
| 2,477,948 | Allen | Aug. 2, 1949 |
| 2,605,220 | Logan | July 29, 1952 |
| 2,633,453 | McAllister | Mar. 31, 1953 |
| 2,678,915 | Kalinske | May 18, 1954 |
| 2,780,360 | Bon et al. | Feb. 5, 1957 |

OTHER REFERENCES

"The Dorr Type MA Digester," Bulletin No. 6591, copyright 1949, 4 pages, The Dorr Company Barry Place, Stamford, Conn.